(12) United States Patent
Prueitt

(10) Patent No.: US 8,424,306 B2
(45) Date of Patent: Apr. 23, 2013

(54) AIR-WATER POWER GENERATION SYSTEM

(76) Inventor: Melvin L. Prueitt, Los Alamos, NM (US)

(*) Notice: Subject to any disclaimer, the term of this patent is extended or adjusted under 35 U.S.C. 154(b) by 434 days.

(21) Appl. No.: 12/753,423

(22) Filed: Apr. 2, 2010

(65) Prior Publication Data

US 2010/0251714 A1    Oct. 7, 2010

Related U.S. Application Data

(60) Provisional application No. 61/167,230, filed on Apr. 7, 2009.

(51) Int. Cl.
*F01K 27/00* (2006.01)
*F03G 7/00* (2006.01)
*F03G 7/04* (2006.01)
*F03G 7/06* (2006.01)
*F03G 6/00* (2006.01)

(52) U.S. Cl.
USPC ............... 60/641.1; 60/641.6; 60/641.11

(58) Field of Classification Search ............... 60/641.1, 60/641.6, 398
See application file for complete search history.

(56) References Cited

U.S. PATENT DOCUMENTS

| | | | |
|---|---|---|---|
| 4,742,682 A * | 5/1988 | Assaf et al. ............ 60/641.1 |
| 5,419,147 A | 5/1995 | Cooper | |
| 6,006,538 A | 12/1999 | Prueitt | |
| 2011/0088399 A1 * | 4/2011 | Briesch et al. ............ 60/728 |

* cited by examiner

*Primary Examiner* — Thomas Denion
*Assistant Examiner* — Steven D Shipe

(57) ABSTRACT

The Air-Water Power Generation System utilizes the temperature differential between warm air and a surface cooled by water evaporation. To enhance the temperature differential, the air that evaporates the water is first cooled by releasing heat to boil the working fluid in a boiler and then is cooled further by a counter-flow heat exchanger before the air enters the condenser where a water film is evaporating. The air then becomes colder as the water evaporates in the condenser, and this provides the cooling to condense the working fluid. Finally, the cold air flows out of the condenser and flows back through the counter-flow heat exchanger to provide the cooling of the air flowing from the boiler.

6 Claims, 2 Drawing Sheets

AIR-WATER POWER GENERATION SYSTEM

CROSS-REFERENCE TO RELATED APPLICATIONS

This application claims the benefit of the filing of U.S. Provisional Patent Application Ser. No. 61/167,230 filed 7 Apr. 2009, entitled Air-Water Power Generation System.

BACKGROUND OF THE INVENTION

OTEC (Ocean Thermal Energy Conversion) plants use the temperature differential between the warm surface water (80° F., 26.7° C.) near the equator and the cold deep water (45° F., 7.2° C. at 1,500 feet) to produce electrical power. For OTEC, the temperature differential is 19.5° C. An OTEC power plant has been operating in Hawaii for many years. Since the temperature differential is so small, the efficiency is low (about 3%), but since there are huge quantities of warm and cold seawater available, it is a good source of energy. These plants use a refrigerant, such as propylene or ammonia as a working fluid.

Many geothermal power plants also use refrigerants as the working fluid, since the temperatures are too low to use water effectively.

In prior art, my patent U.S. Pat. No. 6,006,538, entitled "Air Conditioner Energy System," describes an engine that produces cool air and produces power. It is not as efficient as the invention described herein, because it does not use the cooled air for pre-cooling the air that flows to the condenser.

SUMMARY OF THE INVENTION

Power can be produced by using the temperature differential produced between warm air and the evaporation of water. With the Air-Water Power Generation System (which we may call "AirWatt") that is described herein, it is possible to have temperature differentials of 30° C. or greater, and the efficiencies can be 9% or greater. Larger temperature differentials mean higher efficiencies. AirWatt works best at low ambient humidities. Since the latent heat of water evaporation is large, a small amount of water can provide the heat to produce a lot of power.

A 100 MW OTEC plant has to pump about 200 cubic meters of warm surface water and about the same amount of cold deep water per second into the heat exchangers. If the Air-Water Power plant used that much water, it would produce 50,000 MW of power. Of course, the power output depends on the humidity of the air. These calculations are based on a relative humidity of 10%, which means that it is preferable to build the plants in desert regions where water is available. Table I gives the theoretical performance for the Air-Water Power Generation System as a function of humidity. The numbers were calculated by a computer program called Airpower.exe. The table numbers assume an ambient temperature of 40° C. (104° F.).

The performance of an actual AirWatt plant will be somewhat below the values given in the Table I, because those calculations ignore friction losses.

TABLE I

This table gives the power output, theoretical efficiency, water use, and temperature differential per cubic meter of air input as a function of humidity.

| Relative Humidity (%) | Power/m³ of air/sec | Efficiency (%) | Water Used (gm) | Temperature Differential |
|---|---|---|---|---|
| 1 | 1400 watts | 11.8 | 4.78 | 40° C |
| 5 | 1235 | 10.3 | 4.78 | 37° |
| 10 | 1065 | 8.9 | 4.74 | 32° |
| 20 | 821 | 6.8 | 4.71 | 25° |
| 30 | 638 | 5.4 | 4.65 | 19° |
| 40 | 489 | 4.1 | 4.61 | 15° |
| 50 | 377 | 3.8 | 4.30 | 12° |

The input temperature of the air is 40 C.

The AirWatt requires a large airflow. It derives its heat from the input of warm air. The evaporation of water provides the heat sink. The warm air boils the refrigerant, and after the high-pressure vapor flows through a turbine, the vapor flows to a condenser where it is condensed by the evaporation of water.

The important thing about the AirWatt is that it is designed to give larger temperature differentials between boiler and the condenser than would be provided by simply flowing ambient air over the evaporating water. Larger temperature differentials give higher efficiencies. Evaporation of water in air normally cools the surface to wet-bulb temperatures. By cooling the air first without increasing the amount of water in the air, the wet-bulb temperature can be lowered so that it approaches the dew-point temperature. Table II gives some values of wet-bulb and dew-point temperatures for various input air temperatures and relative humidities.

TABLE II

| Air Temperature (Degrees C./F.) | Relative Humidity (%) | Wet-Bulb Temperature (C./F.) | Dew-point Temperature (C./F.) |
|---|---|---|---|
| 30/86 | 10 | 13.2/55.8 | −4.7/23.5 |
| 30/86 | 15 | 14.5/58.1 | 0.6/33.1 |
| 30/86 | 20 | 15.7/60.3 | 4.5/40.1 |
| 30/86 | 30 | 17.9/64.2 | 10.5/50.9 |
| 30/86 | 40 | 20.0/68.0 | 14.9/58.8 |
| 30/86 | 50 | 22.0/71.6 | 18.4/65.1 |
| 35/95 | 10 | 15.9/60.6 | −1.0/30.2 |
| 35/95 | 20 | 18.8/65.8 | 8.6/47.5 |
| 35/95 | 30 | 21.5/70.7 | 14.8/58.6 |
| 35/95 | 40 | 23.8/74.8 | 19.3/66.7 |
| 40/104 | 5 | 16.7/62.1 | −6.7/19.9 |
| 40/104 | 10 | 18.5/65.3 | 2.6/36.7 |
| 40/104 | 20 | 22.0/71.6 | 12.8/55.0 |
| 40/104 | 30 | 24.9/76.8 | 19.1/66.4 |
| 40/104 | 40 | 27.7/81.9 | 23.8/74.8 |

As an example, in a desert when the relative humidity is 5%, the theoretical power output of an engine that uses evaporation of water to cool the condenser is 615 watts per cubic meter of air per second with an efficiency of 5%. An AirWatt engine would produce 1,235 watts at 10% efficiency with the same amount of air.

In order to generate 10 MW, AirWatt would need about 10,000 cubic meters of air per second. We can compare that to a 1.5 MW wind turbine, which will typically have 58,000 cubic meters of air per second flowing through the area of its blade swing. The 10 MW AirWatt would also need 47.4 kg (12.54 gallons) of water per second. That is only 4.74 kg/second per Megawatt. This water could be water from a lake, stream, river, ocean, or from an underground aquifer. If it were from the ocean, a larger quantity of water would be needed, because we do not want the salinity to become too high as part of the water evaporates.

Since power units like OTEC and AirWatt have relatively small temperature differentials, they need to have high-efficiency heat exchangers.

AirWatt uses only air and water and emits only air and water (and electricity).

It is therefore an object of the present invention to provide a method of transferring heat from warm air to the boiler of a power generating engine to boil and superheat a working fluid, which drives a turbine, and the exhaust working fluid from the turbine is condensed in a condenser that is cooled by evaporating water.

It is another object of the present invention to cool the warm air as it flows through the boiler so that its wet-bulb temperature is lowered.

It is another object of the present invention to cool the warm air further by flowing it through a counter-flow heat exchanger so that its wet-bulb temperature is lowered further.

It is another object of the present invention to use the cooled air from the counter-flow heat exchanger to flow through the condenser to evaporate a portion of a water film that flows down the surfaces of the condenser to provide cooling for the working fluid in the condenser and to provide further cooling to the flowing air.

It is another object of the present invention to use the cooled air flowing through the condenser to flow back through the counter-flow heat exchanger to provide cooling for the air that is flowing from the boiler.

It is another object of the present invention to present possible configurations of heat exchanger designs for the boiler and the condenser.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate embodiments of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
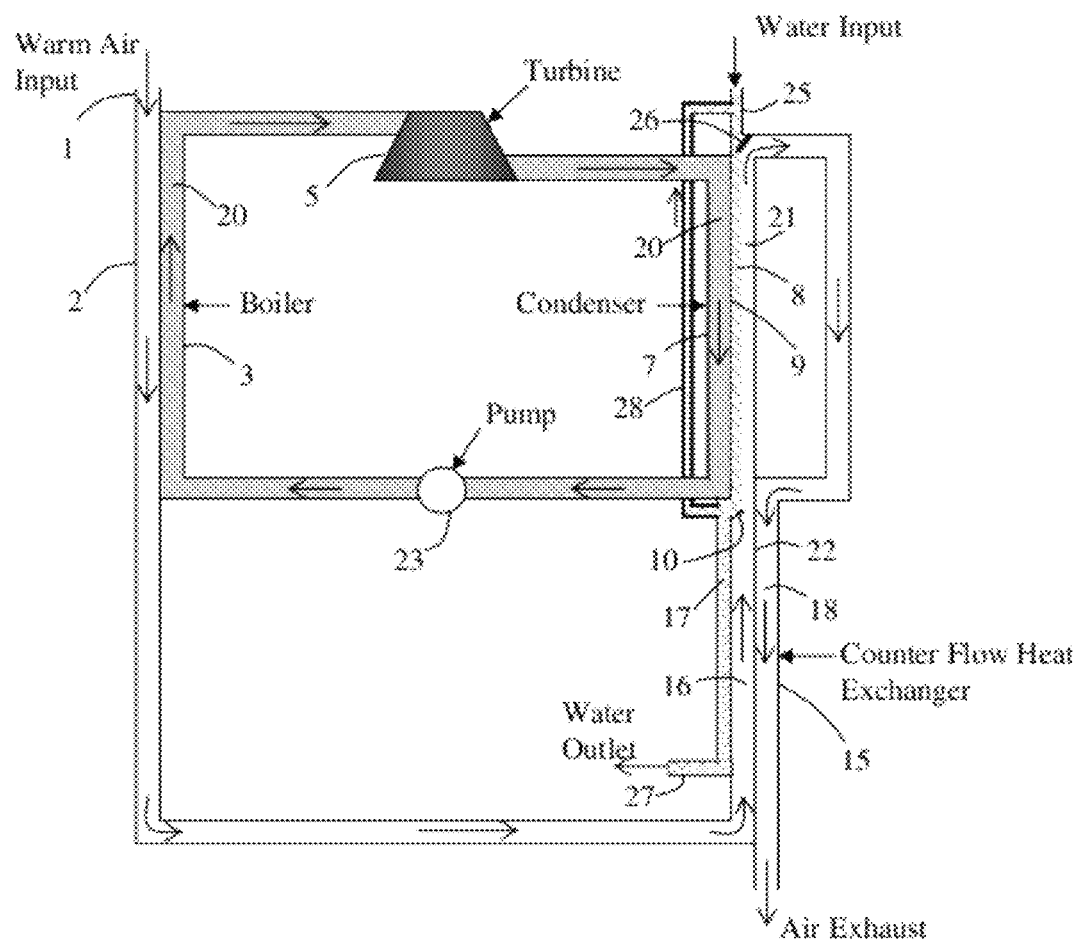
FIG. 1 is a schematic drawing that presents the theory of the operation of the Air-Water Power Generation System.

FIG. 1 presents the theory of operation of AirWatt. Air enters on the upper left at air intake 1 and flows through a boiler heat exchanger 2 where it heats, boils, and superheats a working fluid 20 in the boiler 3. The working fluid vapor flows to the turbine 5 to generate electricity. The exhaust from the turbine flows to the condenser heat exchanger 7 where it is cooled and condensed by a cool film of water 8 that is flows down the wall 9 that separates the working fluid from water film and the airflow in channel 21.

As the input air flows through the boiler heat exchanger, it is cooled as it releases heat to the working fluid. It then flows to a counter-flow heat exchanger 15, where it is further cooled. Heat flows out of the air in channel 16 and into cool water in channel 17 on one side and into cool air in channel 18 on the other side of channel 16 of the heat exchanger (a real engine would have many parallel channels). The air in channel 16 then flows to the condenser heat exchanger 7 where it causes partial evaporation of the water film 8. The air is cooled further by the evaporating water. After the air leaves the condenser, it flows back to the counter-flow heat exchanger 15 and flows in channel 18 to aid in cooling the air that is flowing in channel 16 to the condenser. The air in channel 18 is then exhausted.

The water enters the condenser through the water inlet 25 and is spread on the surface 9 by a water spreader 26. After flowing down the surfaces and through channel 17, the water flows out the water outlet 27. In case the water entering at inlet 25 is not sufficiently cold, instead of having the water flow through channel 17, it can be piped via pipe 28 back to inlet 25 and recycled. This will provide cold water for the water film. This recycled water will need to be gradually replaced by fresh water to prevent mineral buildup. The flat, slanted deflector 10 funnels the water film 8 into pipe 17 and/or pipe 28.

The importance of the heat exchanger is that if dry air is cooled before it comes into contact with the water film, its wet-bulb temperature is lowered. Thus the condenser will be colder, and that means that the efficiency of the engine will be greater.

Water can also be caused to flow down the right side of wall 22 to cause more cooling of the air. This increases efficiency slightly, but uses much more water.

After the working fluid leaves the condenser, it is pumped by pump 23 back to the boiler.

Figure 2:
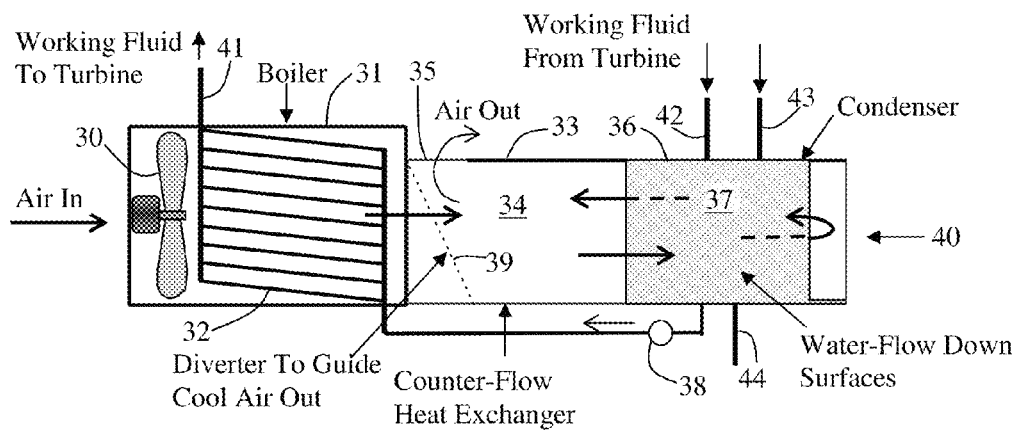
FIG. 2 is a schematic side view of one arrangement of the components of the Air-Water Power Generation System.

FIG. 2 shows a schematic side view of how the components of the AirWatt might be arranged to form a module 40 that might be stacked on other modules. Air enters the left side, which should face toward the prevailing winds. A blower 30 forces the air into the boiler 31, which might contain a set of flat multi-channel conduits 32 like that shown in cross section in FIG. 3. The conduits might be extruded aluminum. A working fluid, such as propane, propylene, or ammonia flows in the channels. Air flows between the conduits and transfers heat to the working fluid. Alternatively, the boiler could contain a set of tubes, which have fins that run along the same direction as the tubes and extend radially from the tubes. The conduits or the tubes are slanted upward so that the fluid boils in the lower end and is superheated as it flows through the upper end. It is similar to a counter-flow heat exchanger. The air cools as it flows to the right in the drawing.

The counter-flow heat exchanger 33 on the right of the boiler can have a set of parallel vertical plates 34 inside that have the warm air entering from the left and flowing through alternate gaps between plates. The air cools as it flows to the right, and the cool air flowing leftward into the right side of the counter-flow heat exchanger flows through the other alternate gaps between the plates and increases in temperature, as it absorbs heat from the air flowing to the right. The air flowing to the left flows out the top exhaust port 35 and is discharged to the right of the unit.

Figure 4:
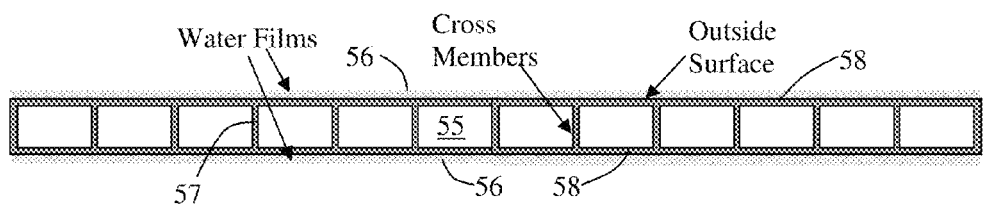
FIG. 4 is a schematic top view of one type of multi-channel conduits for the condenser.

The condenser 36 can be a set of multi-channel conduits 37 with interior channels as shown in FIG. 4. The conduits are placed vertically side-by-side with gaps between them for airflow and water film flow. The working fluid condenses inside the fluid channels in the conduits and flows to the bottom. The fluid is then pumped back to the boiler by pump 38. Water films flow down the outside of the conduits and evaporate into the air flowing between conduits to cool and condense the working fluid. The water is supplied through the water inlet 43. After flowing down the outside of the condenser conduits, the water flows out pipe 44. Actually, the cold water can directed through parts of the counter-flow heat exchanger to help cool the air flowing to the condenser, but this is not shown in FIG. 2.

The air flowing from the left into the condenser unit flows through gaps between alternate conduits and reverses direction on the right and flows back through the other alternate gaps between conduits. Then this air flows back through the counter-flow heat exchanger 34 and is diverted by diverter strips 39 upward to an exhaust port 35. The diverter strips are placed between alternate conduits where the air is flowing to the left.

The working fluid vapor that is generated in the boiler 31 flows through pipe 41 to a turbine (not shown) and then returns from the turbine through pipe 42 to the condenser 36. Module 40 can be stacked on similar modules, and the modules can be bolted together to form a wall of modules that face into the prevailing wind. The pipes 41 and 42 of the modules can be connected to manifolds that carry the working fluid to and from the turbine.

Figure 3:
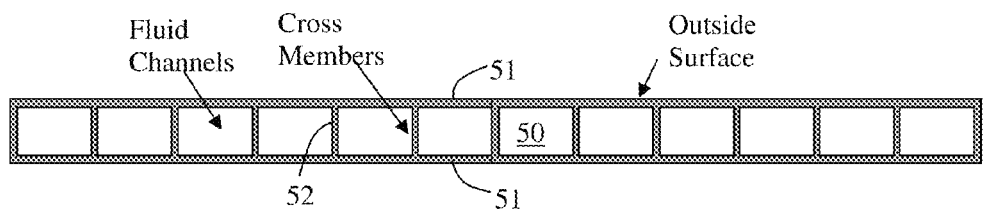
FIG. 3 is a schematic end view of one type of multi-channel conduits for the boiler.

FIG. 3 shows one possible configuration of the boiler elements that contain the working fluid. It is an end view schematic of multi-channel conduits with interior channels 50 for the working fluid. Warm air flows by the outside surfaces 51 and transfers heat into the surfaces. Cross member 52 provides strength to support the outside sheets 51 against the pressure of the working fluid. They also provide extra heat paths and heat surfaces for transferring heat into the working fluid. If necessary, fins can be connected to the outside surfaces and extend into the air paths.

FIG. 4 is a top view of the multi-channel conduits of the condenser with interior channels for condensing the working fluid. This is quite similar to the conduits of FIG. 3. Working fluid condenses in channels 55 and flows to the bottom. Water films 56 flow down the outside. Cross members 57 provide strength for the conduit and provide extra heat paths to conduct heat out of the conduit to the water films on the outside surfaces 58.

Alternatively, rather than being like the designs of FIGS. 3 and 4, the boiler and condenser heat exchangers might be any other heat exchanger design.

What is claimed is:

1. An air-water power generation system comprising:
    a boiler comprising conduits for the passage of a working fluid where the working fluid is boiled and superheated;
    spaces between the boiler conduits for the passage of air to supply heat to boil and superheat the working fluid as the air is cooled;
    a counter-flow heat exchanger to further cool the air;
    a turbine or other expander for utilizing the working fluid vapor to produce mechanical power;
    a condenser comprising conduits for the working fluid for condensing the working fluid vapor to a working fluid liquid after the working fluid vapor leaves the turbine or other expander;
    channels between the condenser conduits for conducting the cooled air along surfaces of the condenser conduits;
    a water intake pipe;
    water spreaders at an outside top of the condenser conduits for accepting water from the water intake pipe and for distributing a thin film of the water to flow down an outside of the condenser conduits;
    channels for conducting the cooled air back to the counter-flow heat exchanger to provide cooling for the air flowing from the boiler;
    a pump to pump the working fluid liquid from the condenser to the boiler; and
    a blower to blow the air into the boiler;
    wherein the air is blown by the blower into the spaces between the boiler conduits in the boiler to supply heat to boil and superheat the working fluid in the boiler conduits as the air is cooled, and the superheated working fluid vapor flows through the turbine to produce mechanical power, and the working fluid vapor flows to the condenser, and the air, after flowing through the boiler, flows through the counter-flow heat exchanger to be cooled further, and then the air flows into the channels between the condenser conduits to be cooled further as it causes the evaporation of the water from the water films that flow down the outside of the condenser conduits, and the evaporation of the water from the thin water films cools and condenses the working fluid within the condenser conduits, and the further cooled air thereafter flows back to the counter-flow heat exchanger to cool the air flowing from the boiler, and then the air directed from the condenser through the counter-flow heat exchanger is exhausted, and the working fluid liquid is pumped back to the boiler.

2. An air-water power generation system according to claim 1, wherein the boiler conduits have outside surfaces and have interior cross members to provide support for the outside surfaces and to provide heat conduction into the interior to heat the working fluid.

3. An air-water power generation system according to claim 1, wherein the boiler conduits are slanted upward into the incoming air flow so that the working fluid boils at lower ends of the conduits and is superheated in upper ends of the conduits.

4. An air-water power generation system according to claim 1, wherein the condenser conduits have outside surfaces and have interior cross members to provide support for the outside surfaces and to provide heat conduction from the interior in order to cool and condense the working fluid.

5. An air-water power generation system according to claim 1, wherein the water that flows down the outside of the condenser conduits is collected and piped into a portion of the counter-flow heat exchanger to help cool the air that is flowing from the boiler to the condenser.

6. An air-water power generation system according to claim 1, wherein a portion of the water from the water films that flow down the outside of the condenser conduits is collected and recycled to the water intake pipe to provide cool water for the water films that flow down the outside surfaces of the condenser conduits.

\* \* \* \* \*